US007951887B2

United States Patent
Yamaguchi et al.

(10) Patent No.: US 7,951,887 B2
(45) Date of Patent: May 31, 2011

(54) PROCESS FOR PRODUCING A POLYMER (75) Inventors: Shoji Yamaguchi, Chiba-ken (JP); Hideo Kubo, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 1472 days.

(21) Appl. No.: 10/558,814

(22) PCT Filed: May 26, 2004

(86) PCT No.: PCT/JP2004/007635
§ 371 (c)(1), (2), (4) Date: Nov. 28, 2005

(87) PCT Pub. No.: WO2004/106398
PCT Pub. Date: Dec. 12, 2004

(65) Prior Publication Data
US 2007/0015890 A1    Jan. 18, 2007

(30) Foreign Application Priority Data

May 30, 2003  (JP) ................................. 2003-155264

(51) Int. Cl.
*C08F 112/04*    (2006.01)
(52) U.S. Cl. ........................................ 526/319; 526/335
(58) Field of Classification Search .................. 526/319, 526/335
See application file for complete search history.

(56) References Cited

U.S. PATENT DOCUMENTS

| | | | | |
|---|---|---|---|---|
| 4,169,115 A | * | 9/1979 | Tung et al. | 525/314 |
| 5,272,211 A | * | 12/1993 | Sutherland et al. | 525/299 |
| 5,476,904 A | * | 12/1995 | Heim et al. | 525/299 |
| 5,514,753 A | * | 5/1996 | Ozawa et al. | 525/279 |
| 5,665,827 A | * | 9/1997 | Hall | 525/280 |

FOREIGN PATENT DOCUMENTS

| | | | |
|---|---|---|---|
| JP | 53-121895 | | 10/1978 |
| JP | 6-206952 A | | 7/1994 |
| JP | 10-139842 A | | 5/1998 |
| JP | 2002-88109 A | | 3/2002 |
| JP | 2002-206003 | | 7/2002 |
| JP | 2002206003 A | * | 7/2002 |
| JP | 20022006003 A | * | 7/2002 |

OTHER PUBLICATIONS

Pang et al., Synthesis and Characterization of Polystyrene-Poly(Tert-Butyl Methacrylate) Block Copolymer, Perrochemical Technology, vol. 29, No. 6, pp. 428-431, 2000.

* cited by examiner

*Primary Examiner* — Michael M Bernshteyn
(74) *Attorney, Agent, or Firm* — Oliff & Berridge, PLC (57) ABSTRACT The object of the present invention is to provide a process for industrially advantageously producing a polymer having a high molecular weight and a narrow, monodispersed molecular weight distribution, and more particularly, a block copolymer of an anionic polymerizable monomer and an acrylic monomer. The object of the present invention was able to be achieved by reacting an acrylic monomer with a polymer anion, the terminal of which has been modified by a compound that forms a living carbanion capable of polymerizing an anionic polymerizable monomer by reacting with an anion, but which itself does not polymerize, in the presence of a compound represented by formula (1): (R1)nM (wherein, R1 represents a C1-C20 alkyl group or a C6-C20 aryl group, R1 may be the same or different in the case n is 2 or more, M represents an atom belonging to Group 2, 12 or 13 of the long form of the periodic table, and n represents the valency of M).

7 Claims, 3 Drawing Sheets

PROCESS FOR PRODUCING A POLYMER

RELATED APPLICATIONS

This application is a 35 U.S.C. 371 national stage filing of International Application No. PCT/JP2004/007635, filed 26 May 2004, which claims priority to Japanese Patent Application No. 2003-155264 filed on 30 May 2003 in Japan. The contents of the aforementioned applications are hereby incorporated by reference.

TECHNICAL FIELD

The present invention relates to a process for producing a polymer having a high molecular weight, and a narrow, monodispersed molecular weight distribution (the molecular weight distribution pattern is composed of a monodisperse).

BACKGROUND ART

Numerous technologies have been proposed in recent years such as nanoprocessing that utilize functions resulting from the self-assemble of block copolymers, and the polymers normally used for this purpose preferably have a high molecular weight and narrow, monodispersed molecular weight distribution.

A production process for polymers having a high molecular weight and narrow molecular weight distribution is known in the prior art for living anionic polymers of anionic polymerizable monomers such as vinyl aromatic compounds and conjugated diene compounds (see Japanese Unexamined Patent Application, First Publication No. 2002-206003).

DISCLOSURE OF THE INVENTION

However, even when a block copolymer of an anionic polymerizable monomer and acrylic monomer was attempted to be produced using the production process described in this reference, it was difficult to obtain a polymer having a high molecular weight and narrow, monodispersed molecular weight distribution.

In consideration of these circumstances surrounding the prior art, the object of the present invention is to provide a process for industrially effectively producing a polymer having a high molecular weight and a narrow, monodispersed molecular weight distribution, and particularly a block copolymer of an anionic polymerizable monomer and acrylic monomer.

As a result of conductive extensive studies to solve the aforementioned problems, the inventors of the present invention found that a polymer having a high molecular weight and a narrow, monodispersed molecular weight distribution can be efficiently produced by reacting an acrylic monomer with a polymer anion, in which the propagation terminal of a dimer or larger polymer prepared from an anionic polymerizable monomer and an anionic polymerization initiator forms a living carbanion capable of polymerizing an anionic polymerizable monomer by reacting with an anion, but which itself does not polymerize, in the presence of a specific organometallic compound, thereby leading to completion of the present invention.

According to the present invention, a process of producing polymer is provided comprising reacting an acrylic monomer with a polymer anion, the terminal of which has been modified by a compound that forms a living carbanion capable of polymerizing an anionic polymerizable monomer by reacting with an anion, but which itself does not polymerize, in the presence of a compound represented by formula (1): (R1)nM (wherein, R1 represents a C1-C20 alkyl group or a C6-C20 aryl group, R1 may be the same or different in the case n is 2 or more, M represents an atom belonging to Group 2, 12 or 13 of the long form of the periodic table, and n represents the valency of M).

In the production process of the present invention, the polymer anion is preferably a polymer anion obtained by reacting a propagation terminal of a polymer prepared from an anionic polymerizable monomer and an anionic polymerization initiator with a compound that forms a living carbanion capable of polymerizing an anionic polymerizable monomer by reacting with an anion, but which itself does not polymerize.

The production process of the present invention is preferably a process of producing polymer having a Step (1), in which a polymer anion of an anionic polymerizable monomer is prepared from an anionic polymerizeable monomer, a compound represented by formula (1): (R1)nM (wherein, R1 represents a C1-C20 alkyl group or a C6-C20 aryl group, R1 may be the same or different in the case n is 2 or more, M represents an atom belonging to Group 2, 12 or 13 of the long form of the periodic table, and n represents the valency of M), and an anionic polymerization initiator; a Step (2), in which a polymer anion is prepared, in which the terminal is modified by a compound that forms a living carbanion capable of polymerizing an anionic polymerizable monomer by reacting with an anion, but which itself does not polymerize, by reacting the polymer anion prepared in Step (1) with a compound that forms a living carbanion capable of polymerizing an anionic polymerizable monomer by reacting with an anion, but which itself does not polymerize; and, a Step (3), in which the polymer anion prepared in Step (2) is reacted with an acrylic monomer. In addition, in this case, the aforementioned Step (1) is more preferably a step in which the anionic polymerizable monomer and the compound represented by formula (1) are polymerized by addition of an anionic polymerization initiator.

In the production process of the present invention, the aforementioned anionic polymerizable monomer is preferably at least one type of vinyl aromatic compound or conjugated diene compound, the compound that forms a living carbanion capable of polymerizing an anionic polymerizable monomer by reacting with the aforementioned anion, but which itself does not polymerize, is preferably a compound having a diphenyl ethylene backbone or stilbene backbone, and the compound represented by formula (I) is preferably a magnesium compound.

According to the production process of the present invention, a polymer can be produced in which the ratio (Mw/Mn) of the weight average molecular weight (Mw) and the number average molecular weight (Mn) is 1.01 to 2.50, and/or the number average molecular weight (Mn) is 20,000 or more.

The following provides a detailed explanation of the process of producing polymer of the present invention.

The process of producing polymer of the present invention comprises reacting an acrylic monomer with a polymer anion in which the terminal has been modified by a compound that forms a living carbanion capable of polymerizing an anionic polymerizable monomer by reaction with an anion, but which itself does not polymerize (hereinafter, "capping agent"), in the presence of a compound represented by formula (1): (R1)nM (wherein, R1 represents a C1-C20 alkyl group or a C6-C20 aryl group, R1 may be the same or different in the case n is 2 or more, M represents an atom belonging to Group 2, 12 or 13 of the long form of the periodic table, and n represents the valency of M).

(Polymer Anion)

There are no particular limitations on the polymer anion used in the present invention provided it is a polymer anion in which the terminal of a dimer or larger polymer of a polymerizable monomer has been anionized. In the present invention, as will be described later, the polymer anion is preferably a polymer anion obtained by reacting the propagation terminal of a polymer prepared from an anionic polymerizable monomer and an anionic polymerization initiator with a capping agent.

(Anionic Polymerization Initiator)

There are no particular limitations on the anionic polymerization initiator used to prepare the polymer anion provided it is a nucleophilic agent and has the function of initiating polymerization of anionic polymerizable monomers, and examples of anionic polymerization initiators that can be used include alkaline metals and organic alkaline metals.

Specific examples of alkaline metals include lithium, sodium, potassium and cesium.

Examples of organic alkaline metals include alkylates, allylates and arylates of the aforementioned alkaline metals. Specific examples include ethyl lithium, n-butyl lithium, sec-butyl lithium, t-butyl lithium, ethyl sodium, lithium biphenyl, lithium naphthalene, lithium triphenyl, sodium naphthalene, potassium naphthalene, α-methylstyrene sodium dianion, 1,1-diphenylhexyl lithium, 1,1-diphenyl-3-methylpentyl lithium, 1,4-dilithio-2-butene, 1,6-dilithiohexane, polystyryl lithium, cumyl calcium and cumyl cesium. One type of these anionic polymerization initiators can be used alone, or two or more types can be used in combination.

The amount of anionic polymerization initiator used is normally 0.001 to 0.2 equivalents, and preferably 0.005 to 0.1 equivalent, based on the anionic polymerizable monomer used. The use of the anionic polymerization initiator in this range enables the target polymer to be produced in good yield.

(Capping Agent)

There are no particular limitations on the capping agent used in the present invention provided it is a compound that reacts with the anion portion of the polymer anion, and has the function of forming a propagation terminal anion, but does not polymerize itself. A compound having a diphenyl ethylene backbone or stilbene background is particularly preferable from the viewpoint of being easily acquired and enabling the target polymer to be produced efficiently.

Specific examples of compounds having a diphenyl ethylene backbone include 1,1-diphenyl ethylene, 1,1-di(p-methylphenyl) ethylene, 1,1-di-(m-methylphenyl) ethylene, 1,1-di(p-chlorophenyl) ethylene and 1,1-di(m-chlorophenyl) ethylene.

Specific examples of compounds having a stilbene backbone include stilbene (trans-1,2-diphenyl ethylene), isostilbene (cis-1,2-diphenyl ethylene), trans-1,2-di(p-methylphenyl) ethylene, 1,2-di(m-methylphenyl) ethylene, 1,2-di(p-chlorophenyl) ethylene, 1,2-di(m-chlorophenyl) ethylene, cis-1,2-di(p-methylphenyl) ethylene, cis-1,2-di(m-methylphenyl) ethylene and cis-1,2-di(p-chlorophenyl) ethylene.

Among these, 1,1-diphenyl ethylene and stilbene are preferable, and 1,1-diphenyl ethylene is particularly preferable since they can be easily acquired and enable the obtaining of the target polymer in good yield.

In addition, a capping agent is preferably used that has been subjected to adequate dehydration treatment and deaerating treatment to suppress the occurrence of side reactions.

The amount of capping agent used is normally 0.5 to 2 equivalents and preferably 0.8 to 1.2 equivalents based on the anionic polymerization initiator. In addition, the amount of capping agent used is normally 0.001 to 0.2 equivalents and preferably 0.005 to 0.1 equivalents based on the anionic polymerizable monomer. The use of the capping agent within this range allows the most efficient obtaining a polymer that has a high molecular weight and a narrow, monodispersed molecular weight distribution.

(Compound Represented by Formula (1))

In the production process of the present invention, a compound represented by formula (1): $(R1)_nM$ (hereinafter, "Compound (1)") is used. Compound (1) has the function of allowing polymerization to proceed smoothly by stabilizing the propagation terminal of the polymer by coordinating a metal ion of Compound (1) on the propagation terminal. In addition, in the case an active hydrogen compound or other substance that inhibits anionic polymerization is present in the system, it prevents the polymerization reaction from being inhibited by reacting with the active hydrogen compound and so forth.

In formula (1), R1 represents a hydrogen atom, halogen atom, C1-C20 alkyl group or C6-C20 aryl group.

Examples of hydrogen atoms include chlorine, bromine and iodine atoms. Examples of C1-C20 alkyl groups include methyl, ethyl, n-propyl, isopropyl, n-butyl, s-butyl, t-butyl, isobutyl, amyl, hexyl and benzyl groups. In addition, examples of C6-C20 aryl groups include phenyl and naphthyl groups.

In formula (1), n represents the valence of M, and when n is 2 or more, R1 may be the same or different.

M represents an atom belonging to Group 2 of the long form of the periodic table such as magnesium or calcium, an atom belonging to Group 12 such as cadmium, or an atom belonging to Group 13 such as aluminum.

Specific examples of Compound (1) include organic magnesium compounds such as di-n-butyl magnesium, di-t-butyl magnesium, di-s-butyl magnesium, n-butyl-s-butyl magnesium, n-butyl-ethyl magnesium, di-n-amyl magnesium, dibenzyl magnesium and diphenyl magnesium; organic zinc compounds such as diethyl zinc and dibutyl zinc; and, organic aluminum compounds such as trimethyl aluminum, triethyl aluminum, triisobutyl aluminum and tri-n-hexyl aluminum. These can be used alone or two or more types can be used in combination.

In the present invention, organic magnesium compounds are preferable, and dibutyl magnesium is particularly preferable, since they allow polymers having a high molecular weight and narrow, monodispersed molecular weight distribution to be obtained efficiently.

The amount of Compound (1) used is normally 0.5 to 2 equivalents, and preferably 0.7 to 1.2 equivalents, based on the anionic polymerization initiator. In addition, the amount of Compound (1) used is normally 0.001 to 0.2 equivalents, and preferably 0.005 to 0.1 equivalent, based on the anionic polymerizable monomer used. As a result of using Compound (1) within this range, a polymer having a high molecular weight and a narrow, monodispersed molecular weight distribution can be obtained most efficiently.

A process of producing polymer of the present invention comprises reacting an acrylic monomer with a polymer anion in which the terminal has been modified by a capping agent in the presence of Compound (1). In this reaction, the acrylic monomer is anionically polymerized to polymer anion in which the terminal has been modified by a capping agent.

The polymerization reaction of the acrylic monomer is preferably carried out in a suitable solvent. There are no particular limitations on the solvent used provided it is not involved in the polymerization reaction and is compatible with the polymer. Examples of solvents that can be used include ether-based solvents such as diethyl ether, tetrahydrofuran, dioxane and trioxane; aromatic hydrocarbon-based solvents or alicyclic hydrocarbon-based solvents; tertiary amine-based solvents such as tetramethyl ethylene diamine (TMEDA) and hexamethyl phosphoric triamide (HMPA); and mixed solvents composed of two or more types of these solvents.

In the present invention, ether-based solvents are preferable and tetrahydrofuran is particularly preferable since they can be handled easily, allow the reaction to proceed smoothly, and allow the target copolymer to be obtained efficiently. In addition, a solvent is used after adequately dehydrating and deaerating to minimize the occurrence of side reactions.

There are no particular limitations on the amount of solvent used, and the amount used can be suitably determined according to the reaction scale, type of solvent and type of monomer, etc. Normally, the concentration of monomer used relative to the solvent is within the range of 1 to 70% by weight and preferably 3 to 40% by weight.

A production process of the present invention preferably has a Step (1), in which a polymer anion of an anionic polymerizable monomer is prepared from an anionic polymerizable monomer, Compound (1) and an anionic polymerization initiator, a Step (2), in which a polymer anion is prepared, in which the terminal has been modified by a capping agent and the polymer anion prepared in step (1), and a Step (3), in which the polymer anion prepared in Step (2) is reacted with an acrylic monomer.

According to this production process, Compound (1) is present throughout the entire process of producing polymer according to the present invention, and in the case polymerization is allowed to proceed smoothly by stabilizing the anionic propagation therminal of the polymer, and a substance such as an active hydrogen compound that inhibits anionic polymerization is present in the system, Compound (1) reacts with the active hydrogen substance without inhibiting anionic polymerization, thereby being able to effectively prevent the polymerization reaction from being inhibited.

In Step (1), a polymer anion of an anionic polymerizable monomer is prepared from an anionic polymerizable monomer, Compound (1) and an anionic polymerization initiator. There are no particular limitations on the anionic polymerizable monomer used provided anions are generated by the anionic polymerization initiator, and it anionically polymerizes due to the repetition of an addition reaction that uses these anions as reaction active sites. Examples of monomers that can be used include vinyl aromatic compounds, conjugated diene compounds, and acrylic monomers. Among these, vinyl aromatic compounds and conjugated diene compounds are preferable, with vinyl aromatic compounds being particularly preferable.

Examples of vinyl aromatic compounds include styrene, α-alkyl styrenes, nucleus-substituted styrenes, and α-alkyl-nucleus-substituted styrenes. Examples of α-alkyl styrenes include α-methyl styrene, α-ethyl styrene, α-n-propyl styrene and α-n-butyl styrene.

Nucleus-substituted styrenes are compounds in which the benzene ring (nucleus) of styrene has been substituted with a substituent. Examples of substituents include alkyl, alkoxyalkyl, alkoxy, alkoxyalkoxy, t-butoxycarbonyl, t-butoxycarbonylmethyl and oxygen-containing heterocyclic groups.

Specific examples of nucleus-substituted styrenes include styrenes substituted with an alkyl group such as 4-methyl styrene, 2-methyl styrene, 3-methyl styrene, 4-ethyl styrene, 2,4-dimethyl styrene, 2,5-dimethyl styrene, 4-isopropyl styrene, 2,4,6-triisopropyl styrene, 4-t-butoxy styrene and 3-t-butoxy styrene; styrenes substituted with an alkoxyalkyl group such as 4-methoxymethyl styrene and 4-(1'-ethoxy) ethyl styrene; styrenes substituted with an alkoxy group such as 4-methoxy styrene, 3-isopropoxy styrene and 4-t-butoxy styrene; styrenes substituted with an alkoxyalkoxy group such as 4-methoxymethoxy styrene and 4-ethoxymethoxy styrene; styrenes substituted with a t-butoxycarbonyl group such as 4-t-butoxycarbonyl styrene; and, styrenes substituted with an oxygen-containing heterocyclic group such as 4-tetrahydrofuranyl styrene and 4-tetrahydropyranyl styrene.

α-alkyl-nucleus-substituted styrenes are compounds in which the benzene ring of the aforementioned α-alkyl styrenes has been substituted with a substituent similar to the substituents of the aforementioned nucleus-substituted styrenes, specific examples of which include 4-methyl-α-methyl styrene, 3-methyl-α-methyl styrene, 2-methyl-α-methyl styrene, 2,4-dimethyl-α-methyl styrene, 4-isopropyl-α-methyl styrene and 4-t-butoxy-α-methyl styrene.

Examples of conjugated diene compounds include 1,3-butadiene, isoprene, 2,3-dimethyl butadiene, 2-ethyl-1,3-butadiene and 1,3-pentadiene.

Examples of acrylic monomers include esters of (meth) acrylic acid which may or may not have a substituent, and (meth)acrylonitrile which may or may not have a substituent. Here, (meth)acrylic acid refers to either acrylic acid or methacrylic acid.

Examples of substituents of esters of (meth)acrylic acid which may or may not have a substituent and (meth)acrylonitrile which may or may not have a substituent include alkyl groups having 1 to 18 carbon atoms and benzyl groups. These groups may be further substituted with a halogen atom such as a fluorine atom, a t-amino group, or a carboalkoxy group such as an acetoxy group.

Specific examples of acrylic monomers include methyl (meth)acrylate, ethyl (meth)acrylate, propyl (meth)acrylate, butyl (meth)acrylate, octyl (meth)acrylate, 2-hydroxyethyl (meth)acrylate and 2-hydroxy-3-phenoxypropyl (meth)acrylate. In addition, specific examples of (meth)acrylonitriles which may or may not be substituted include acrylonitrile and methacrylonitrile.

In the present invention, one type of these anionic polymerizable monomers can be used alone, or two or more types can be used in combination. In addition, these anionic polymerizable monomers are preferably used after adequately dehydrating and deaerating to minimize the occurrence of side reactions.

The aforementioned polymer anion can be produced by stirring an anionic polymerizable monomer and anionic polymerization initiator in the presence of Compound (1) at a predetermined temperature in a solvent. There are no particular limitations on the degree of polymerization of the polymer anion provided it is 2 or more, and the amount of anionic monomer added can be suitably adjusted.

The reaction temperature when preparing the polymer anion is the temperature at which anionic polymerization of the anionic polymerizable monomer is completed, and varies according to the reactivity of the anionic polymerizable monomer used. Normally, it is within the range of $-100°$ C. to $+20°$ C., and preferably within the range of $-80°$ C. to $0°$ C. regardless of the time at which Compound (1) is added. If the reaction temperature is lower than $-100°$ C., the reaction rate slows and there are problems in terms of production efficiency. On the other hand, if the temperature is higher than $+20°$ C., there is increased susceptibility to the occurrence of side reactions such as transfer reactions and termination reactions. In addition, the reaction temperature is not required to be throughout the polymerization reaction, but rather may be raised at an arbitrary rate according to the progress of the polymerization reaction.

Reaction time differs according to the reaction temperature and reaction scale, and can be set appropriately. The reaction can be carried out at normal pressure, increased pressure, reduced pressure or in a high vacuum. In addition, it is preferably carried out in a nitrogen, argon, helium or other inert gas atmosphere in order to suppress the occurrence of side reactions.

Completion of the reaction that prepares the polymer anion can be confirmed by the disappearance of the anionic polymerizable monomer from the reaction solution. Disappearance of the anionic polymerizable monomer can be confirmed by, for example, analyzing the reaction solution by gas chromatography.

Step (2) is a step in which a polymer anion, in which the terminal is modified by a capping agent, is prepared by reacting the polymer anion prepared in Step (1) with a capping agent. Namely, a solution of a polymer anion in which the propagation terminal of the polymer has been modified by a capping agent can be obtained by adding a capping agent to a solution of the polymer anion obtained in Step (1) and continuing to stir at a predetermined temperature.

The capping agent may be added directly or it may be added as a solution by dissolving in a suitable solvent. There are no particular limitations on the solvent used provided it is an inert solvent in the reaction, and may be the same as or different from the solvent used in the polymerization reaction of the anionic polymerizable monomer. Since the rate of the polymerization reaction is suitably controlled by the polymer anion in which the propagation terminal has been modified by the capping agent, a block copolymer can be obtained that has a high molecular weight and narrow, monodispersed molecular weight distribution by adding an acrylic monomer.

The reaction temperature of the reaction between the polymer anion and capping agent is normally $-100°$ C. to $+50°$ C., and preferably $-80°$ C. to $+20°$ C. In addition, the reaction is completed in several minutes to several hours. Completion of this reaction can be confirmed by a known analysis means such as gas chromatography or NMR spectroscopy.

Step (3) is a step in which the polymer anion prepared in Step (2) is reacted with an acrylic monomer. Namely, as a result of reacting the polymer anion in which the propagation terminal has been modified by the capping agent with an acrylic monomer in the presence of Compound (1), polymerization of the acrylic monomer begins from the propagation terminal modified by the capping agent, allowing the obtaining of a polymer having a high molecular weight and narrow, monodispersed molecular weight distribution.

An acrylic monomer similar to the acrylic monomers indicated as being able to be used as the aforementioned anionic polymerizable monomers can be used for the acrylic monomer used in this step. One type of acrylic monomer can be used alone, or two or more types can be used in combination. In addition, the acrylic monomer is used after adequately dehydrating and deaerating to minimize the occurrence of side reactions.

There are no particular limitations on the amount of acrylic monomer used, and the amount used can be suitably set according to the molecular weight and so forth of the polymer. The amount of acrylic monomer used is normally 0.01 to 10 equivalents, and preferably 0.1 to 5 equivalents, based on the anionic polymerizable monomer used.

The acrylic monomer may be added directly to the reaction solution, or it may be added as a solution by dissolving in a suitable solvent. In the case of using as a solution, the concentration of the acrylic monomer solution is normally 10 to 90% by weight and preferably 30 to 60% by weight. There are no particular limitations on the solvent used provided it is inert in the reaction, and the solvent may be the same as or different from the solvent used in the polymerization reaction of the anionic polymerizable monomer.

The polymerization reaction temperature of the acrylic monomer is the temperature at which the polymer ion modified by the capping agent reacts with the acrylic monomer and anionic polymerization of the acrylic monomer is completed, and differs according to the reactivity of the monomer used. Similar to the reaction temperature of the aforementioned anionic polymerization reaction, the polymerization reaction temperature of the acrylic monomer is normally $-100°$ C. to $+20°$ C. and preferably $-80°$ C. to $0°$ C.

The polymerization reaction time can be suitably set according to the type and amount of acrylic monomer used, the reaction temperature and so forth. It is normally 10 minutes to 24 hours and preferably 30 minutes to 5 hours. The reaction can be carried out at normal pressure, increased pressure, reduced pressure or in a high vacuum. In addition, it is preferably carried out in a nitrogen, argon, helium or other inert gas atmosphere in order to suppress the occurrence of side reactions.

Completion of the acrylic monomer polymerization reaction can be confirmed by the disappearance of the acrylic monomer from the reaction solution. Disappearance of the acrylic monomer can be confirmed by, for example, analyzing the reaction solution by gas chromatography.

Following completion of the reaction, the target polymer can be isolated by ordinary post-treatment procedures. More specifically, the target polymer can be isolated by terminating the reaction by adding a reaction terminator such as methanol to the reaction solution, and adding an acid and so forth to remove Compound (1) followed by a procedure such as precipitation or filtration.

According to the production process of the present invention, a polymer having a high molecular weight can be obtained. The number average molecular weight of the resulting polymer is normally 20,000 or more, preferably 50,000 or more, and more preferably 100,000 or more. In addition, the number average molecular weight (Mn) and weight average molecular weight (Mw) can be measured by, for example, gel permeation chromatography (GPC).

According to the production process of the present invention, a polymer having a narrow molecular weight distribution can be obtained. The molecular weight distribution, namely the ratio of the weight average molecular weight (Mw) to the number average molecular weight (Mn) (Mw/Mn), of a polymer obtained according to the present invention is preferably 1.01 to 2.50 and more preferably 1.01 to 1.50.

In addition, according to the production process of the present invention, a polymer can be obtained that has a molecular weight of 20,000 or more and a narrow, monodispersed molecular weight distribution. The production process of the present invention is particularly suitable for the production of a block copolymer of an aromatic vinyl compound and an acrylic monomer. A block copolymer obtained according to the production process of the present invention is particularly useful as a material for nanoprocessing by taking advantage of its self-assemble function.

BEST MODE FOR CARRYING OUT THE INVENTION

The following provides a more detailed explanation of the present invention through its examples and comparative examples However, the present invention is not limited in any way by these examples.
(1) Tetrahydrofuran (THF)
Commercially available tetrahydrofuran (Kanto Chemical) was used.
(2) n-Butyl Lithium (n-BuLi) Solution
Commercially available n-BuLi/n-hexane solution (1.6 M, Wako Pure Chemical Industries) was used.
(3) Styrene
Commercially available styrene (Wako Pure Chemical Industries) was used following deaeration treatment by bubbling with nitrogen for 30 minutes.
(4) Methyl Methacrylate (MMA)
Commercially available methyl methacrylate monomer (Wako Pure Chemical Industries) was used following dehydration treatment with a molecular sieve 4A.
(5) Dibutyl Magnesium ($Bu_2Mg$) Solution
Commercially available $Bu_2Mg$/n-heptane solution (1.0 M, Aldrich) was used.
(6) Diphenyl Ethylene (DPE)
Commercially available diphenyl ethylene (Tokyo Kasei Kogyo) was used.
(7) Lithium Chloride (LiCl)
Commercially available lithium chloride (Wako Pure Chemical Industries) was used.

Example 1

1.69 g (4.1 mmol) of n-BuLi solution were added to 562 g of THF at −40° C. in a nitrogen atmosphere. A mixed solution obtained by adding 2.72 g (19% by weight, 3.8 mmol) of $Bu_2Mg$ solution to 29.9 g (287 mmol) of styrene at −40° C. in a nitrogen atmosphere was added to this solution followed by stirring for 1 hour at −40° C. Next, 1.12 g (6.2 mmol) of diphenyl ethylene (DPE) were added to this reaction solution. After stirring for 30 minutes at −65° C., 7.7 g (76.7 mmol) of methyl methacrylate were added followed by additionally stirring for 1 hour. Methanol was then added to the resulting reaction mixture to stop the reaction followed by the addition of 1.0 N hydrochloric acid, reprecipitation with methanol/THF (volume ratio: 1:1), filtration and air-drying the resulting filtrate to obtain styrene-methacrylate copolymer A (yield: 99%). The weight average molecular weight of copolymer A was determined to be 59,600 as measured by GPC.

Figure 1:
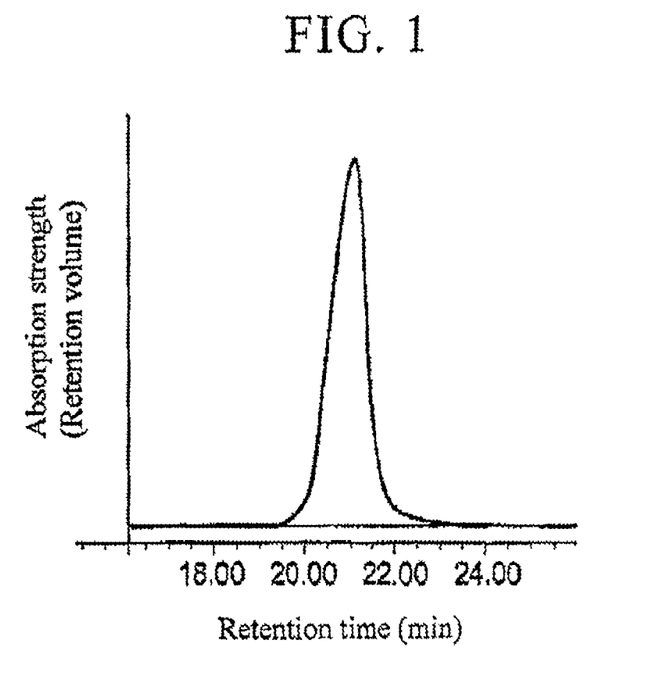
FIG. 1 is a GPC curve of a copolymer obtained in Example 1.

The GPC curve of this copolymer is shown in FIG. 1. In this figure, the horizontal axis represents retention time (minutes), while the vertical axis represents absorption strength (retention volume) (to apply similarly hereinafter). According to FIG. 1, a copolymer having a high molecular weight and narrow, monodispersed molecular weight distribution was obtained in Example 1 that consisted of the addition of DPE and $Bu_2Mg$.

Comparative Example 1

2.2 g (5.3 mmol) of n-BuLi solution were added to 568 g of THF at −40° C. in a nitrogen atmosphere. A mixed solution obtained by adding 3.65 g (19% by weight, 5.1 mmol) of $Bu_2Mg$ solution to 29.8 g (286 mmol) of styrene at −40° C. in a nitrogen atmosphere was added to this solution followed by stirring for 1 hour at −40° C. Next, 12.4 g (124 mmol) of methyl methacrylate were added to this reaction solution followed by additionally stirring for 1 hour at −65° C. Methanol was then added to the resulting reaction mixture to stop the reaction followed by the addition of 1.0 N hydrochloric acid, reprecipitation with methanol/THF (volume ratio: 1:1), filtration and air-drying the resulting filtrate to obtain styrene-methacrylate copolymer B (yield: 99%). The weight average molecular weight of copolymer B was 293,700.

Figure 2:
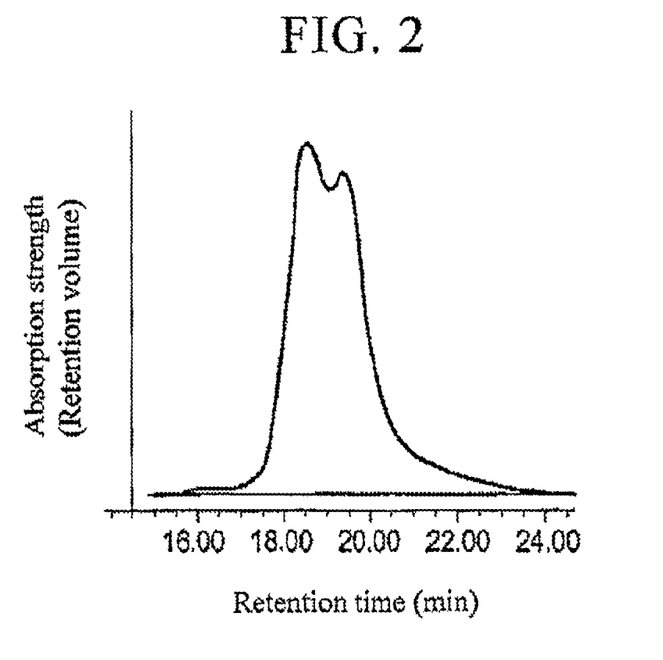
FIG. 2 is a GPC curve of a copolymer obtained in Comparative Example 1.

The GPC curve of this copolymer is shown in FIG. 2. According to FIG. 2, a copolymer, in which a molecular weight is high and a molecular weight distribution is narrow but is bimodal, was obtained in Comparative Example 1 in which DPE (capping agent) was not added.

Comparative Example 2

1.4 g (3.4 mmol) of n-BuLi solution were added to 597 g of THF at −40° C. in a nitrogen atmosphere. 48.9 g (470 mmol) of styrene were added at −40° C. followed by stirring for 1 hour at −40° C. Next, 0.63 g (3.5 mmol) of DPE were added to this reaction solution, and after stirring for 30 minutes at −40° C., 12.1 g (121 mmol) of methyl methacrylate were added followed by additionally stirring for 1 hour at −65° C. Methanol was then added to the resulting reaction mixture to stop the reaction followed by the addition of 1.0 N hydrochloric acid, reprecipitation with methanol/THF (volume ratio: 1:1), filtration and air-drying the resulting filtrate to obtain styrene-methacrylate copolymer C (yield: 99%). The weight average molecular weight of copolymer C was 449,200.

Figure 3:
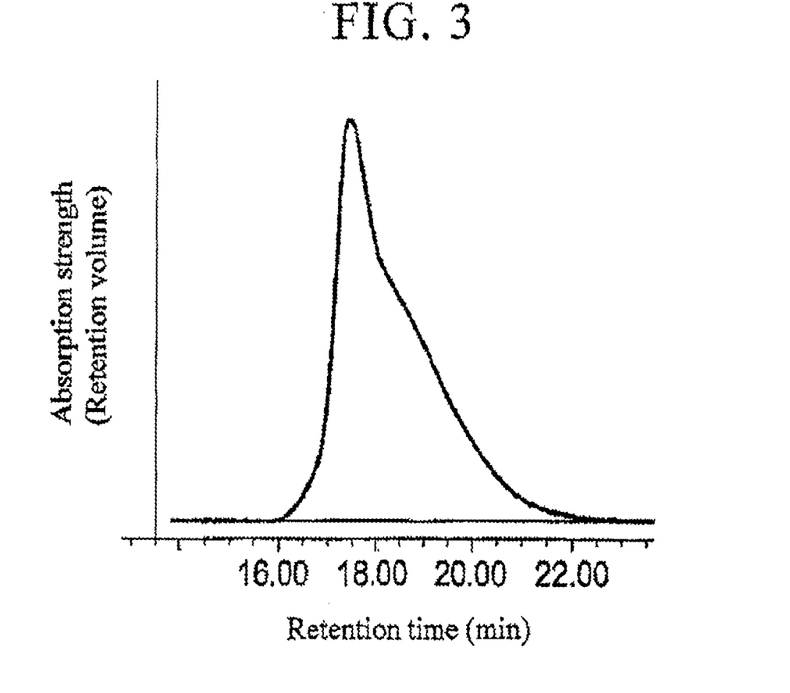
FIG. 3 is a GPC curve of a copolymer obtained in Comparative Example 2.

The GPC curve of this copolymer is shown in FIG. 3. According to FIG. 3, a copolymer, in which a molecular weight is high and a molecular weight distribution has monodisperse but is wide, was obtained in Comparative Example 2 in which $Bu_2Mg$ was not added.

Comparative Example 3

0.5 g (1.3 mmol) of n-BuLi solution were added at room temperature to 270 g of THF to which had been added 0.6 g (1.3 mmol) of lithium chloride (LiCl) at −65° C. in a nitrogen atmosphere. 13.7 g (130 mmol) of styrene were then added to this solution at −65° C. followed by stirring for 1 hour. Next, 14.8 g (150 mmol) of methyl methacrylate were added to this reaction solution followed by additionally stirring for 1 hour at −65° C. Methanol was then added to the resulting reaction mixture to stop the reaction followed by the addition of 1.0 N hydrochloric acid, reprecipitation with methanol/THF (volume ratio: 1:1), filtration and air-drying the resulting filtrate to obtain styrene-methacrylate copolymer D (yield: 99%). The weight average molecular weight of copolymer D was 15,460.

Figure 4:
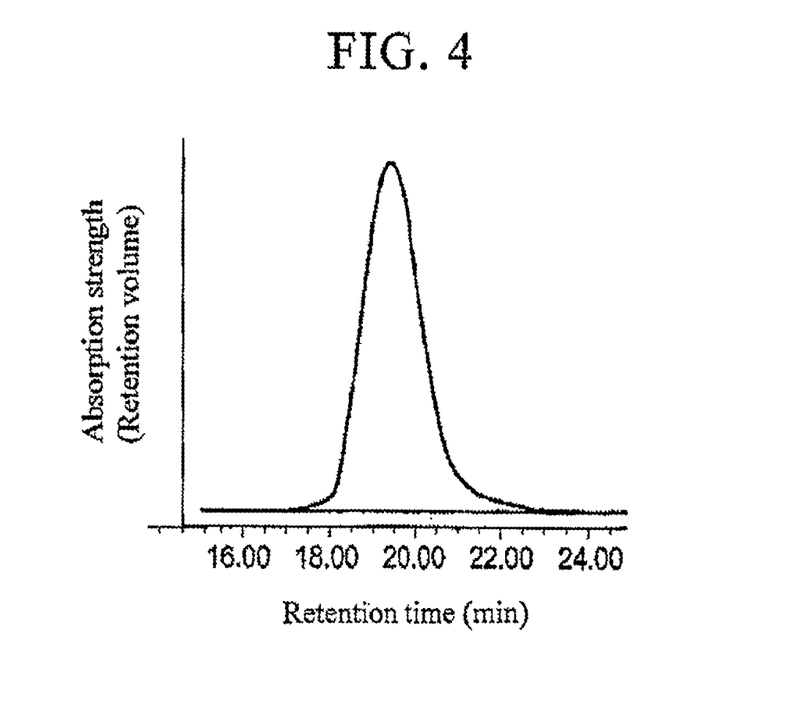
FIG. 4 is a GPC curve of a copolymer obtained in Comparative Example 3.

The GPC curve of this copolymer is shown in FIG. 4. According to FIG. 4, a copolymer, in which a molecular weight is low and a molecular weight distribution has monodisperse but is slightly wide, was obtained in Comparative Example 3 in which LiCl was added.

Comparative Example 4

0.5 g (1.3 mmol) of n-BuLi solution were added to 242 g of THF at −65° C. in a nitrogen atmosphere. 13.0 g (130 mmol) of styrene were added to this solution followed by stirring for 1 hour at −65° C. Next, 14.8 g (150 mmol) of methyl methacrylate were added to this reaction solution followed by additionally stirring for 1 hour at −65° C. Methanol was then added to the resulting reaction mixture to stop the reaction followed by the addition of 1.0 N hydrochloric acid, reprecipitation with methanol/THF (volume ratio: 1:1), filtration and air-drying the resulting filtrate to obtain styrene-methacrylate copolymer E (yield: 99%). The weight average molecular weight of copolymer E was 112,100.

Figure 5:
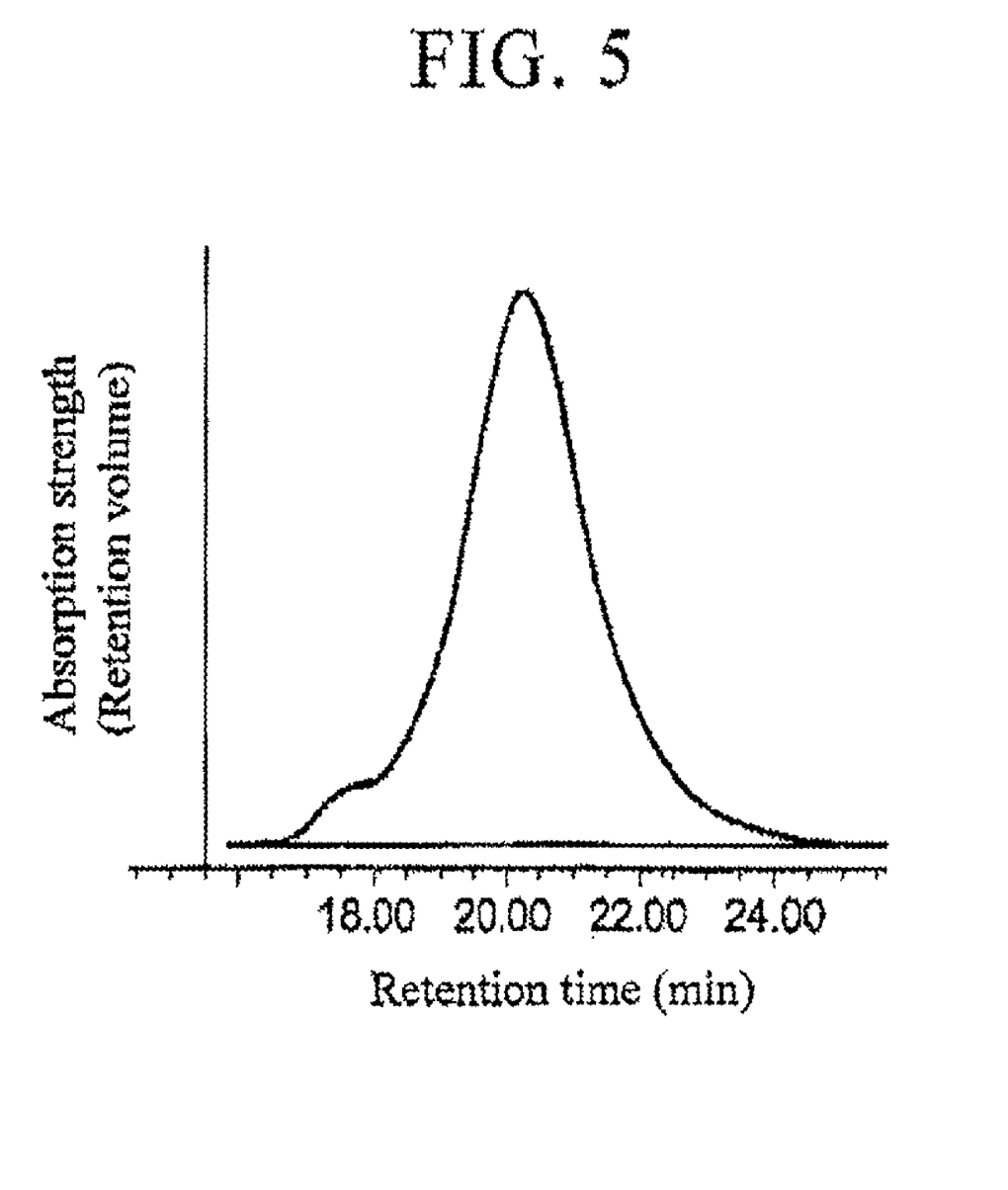
FIG. 5 is a GPC curve of a copolymer obtained in Comparative Example 4.

The GPC curve of this copolymer is shown in FIG. 5. According to FIG. 5, a copolymer, in which a molecular weight is high and a molecular weight distribution has multimodal and is wide, was obtained in Comparative Example 4 in which $Bu_2Mg$ and DPE (capping agent) were not added.

INDUSTRIAL APPLICABILITY

According to the present invention, a block copolymer of an anionic polymerizable monomer and an acrylic monomer can be efficiently produced that has a large molecular weight and a narrow, monodispersed molecular weight distribution. A block copolymer obtained according to the production process of the present invention is particularly useful as a material for nanoprocessing that uses its self-assemble function, and the production process of the present invention can therefore be said to have high value for industrial use.

What is claimed is:

1. A process of producing a polymer, the process comprising:

Step (1); preparing a polymer anion of an anionic polymerizable monomer from:
an anionic polymerizable monomer;
a compound represented by formula (1):

$$(R1)nM \qquad (1)$$

where:
R1 represents a C1-C20 alkyl group or a C6-C20 aryl group,
R1 may be the same or different when n is 2 or more,
M represents an atom belonging to Group 2, 12, or 13 of the long form of the periodic table, and
n represents the valency of M; and
an anionic polymerization initiator;

Step (2); preparing a polymer anion, in which the terminal is modified by a compound that forms a living carbanion capable of polymerizing an anionic polymerizable monomer by reacting with an anion, but which itself does not polymerize, by reacting the polymer anion prepared in Step (1) with a compound that forms a living carbanion capable of polymerizing an anionic polymerizable monomer by reacting with an anion, but which itself does not polymerize, wherein the compound that forms a living carbanion capable of polymerizing an anionic polymerizable monomer by reacting with an anion, but which itself does not polymerize, is a compound having a diphenyl ethylene backbone or stilbene backbone; and Step (3); reacting the polymer anion prepared in Step (2) with an acrylic monomer;
wherein the acrylic monomer is at least one selected from the group consisting of methyl (meth)acrylate, ethyl (meth)acrylate, propyl (meth)acrylate, 2-hydroxyethyl (meth)acrylate, 2-hydroxy-3-phenoxyproyl (meth)acrylate, acrylonitrile, and methacrylonitrile.

2. A process of producing a polymer according to claim 1, wherein the Step (1) is a step in which the anionic polymerizable monomer and the compound represented by formula (1) are polymerized by addition of an anionic polymerization initiator.

3. A process of producing a polymer according to claim 1 or 2, wherein the anionic polymerizable monomer is at least one type of vinyl aromatic compound or conjugated diene compound.

4. A process of producing a polymer according to claim 1 or 2, wherein the compound represented by formula (1) is an organic magnesium compound.

5. A process of producing a polymer according to claim 1 or 2, wherein the ratio (Mw/Mn) of the weight average molecular weight (Mw) and the number average molecular weight (Mn) is 1.01 to 2.50.

6. A process of producing a polymer according to claim 1 or 2, wherein the number average molecular weight (Mn) is 20,000 or more.

7. A process of producing a polymer according to claim 1, wherein the compound represented by formula (1) is a least one selected from the group consisting of di-n-butyl magnesium, di-t-butyl magnesium, di-s-butyl magnesium, n-butyl-s-butyl magnesium, n-butyl-ethyl magnesium, di-n-amyl magnesium, dibenzyl magnesium, diphenyl magnesium, diethyl zinc, dibutyl zinc, trimethyl aluminum, triethyl aluminum, triisobutyl aluminum, and tri-n-hexyl aluminum.

* * * * *

UNITED STATES PATENT AND TRADEMARK OFFICE
CERTIFICATE OF CORRECTION

PATENT NO. : 7,951,887 B2
APPLICATION NO. : 10/558814
DATED : May 31, 2011
INVENTOR(S) : Shoji Yamaguchi et al.

It is certified that error appears in the above-identified patent and that said Letters Patent is hereby corrected as shown below:

Title page:
Replace [75], to read as follows:
--[75] Inventors: Shoji Yamaguchi, Ichihara (JP); Hideo Kubo, Ichihara (JP)--
Replace [87], to read as follows:
--[87] PCT Pub. No.: WO2004/106398, PCT Pub. Date: Dec. 9, 2004--

Signed and Sealed this
Thirtieth Day of August, 2011

David J. Kappos
*Director of the United States Patent and Trademark Office*